May 11, 1937. J. M. CHRISTMAN 2,079,899
MOTOR VEHICLE
Filed Nov. 26, 1934
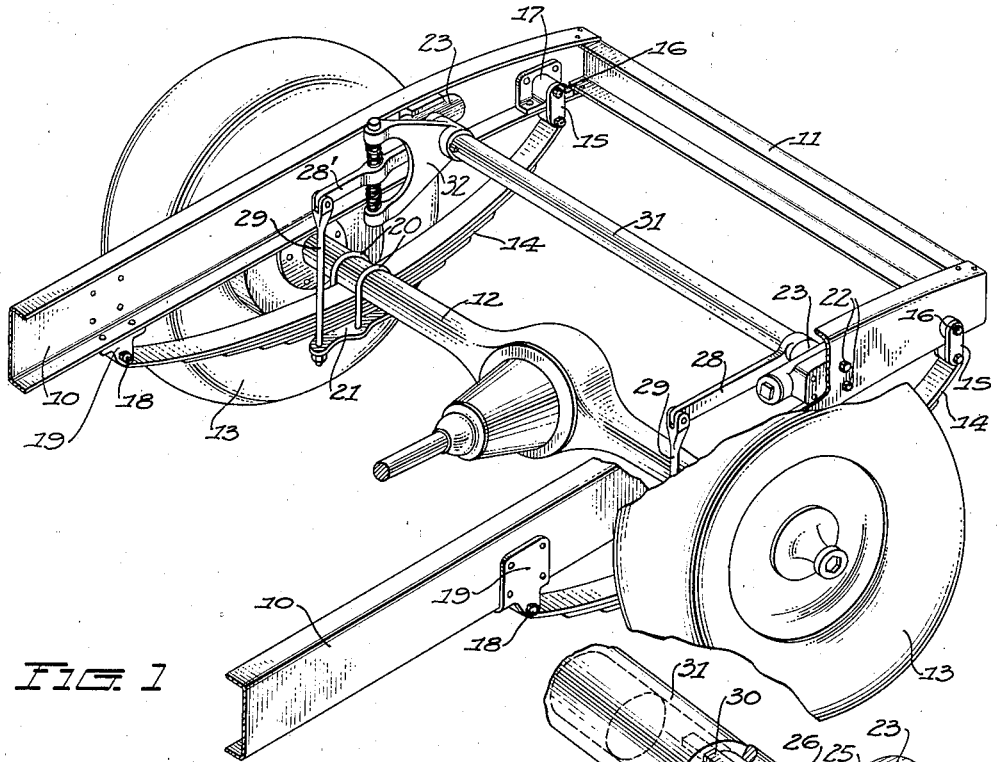
Fig. 1
Fig. 3
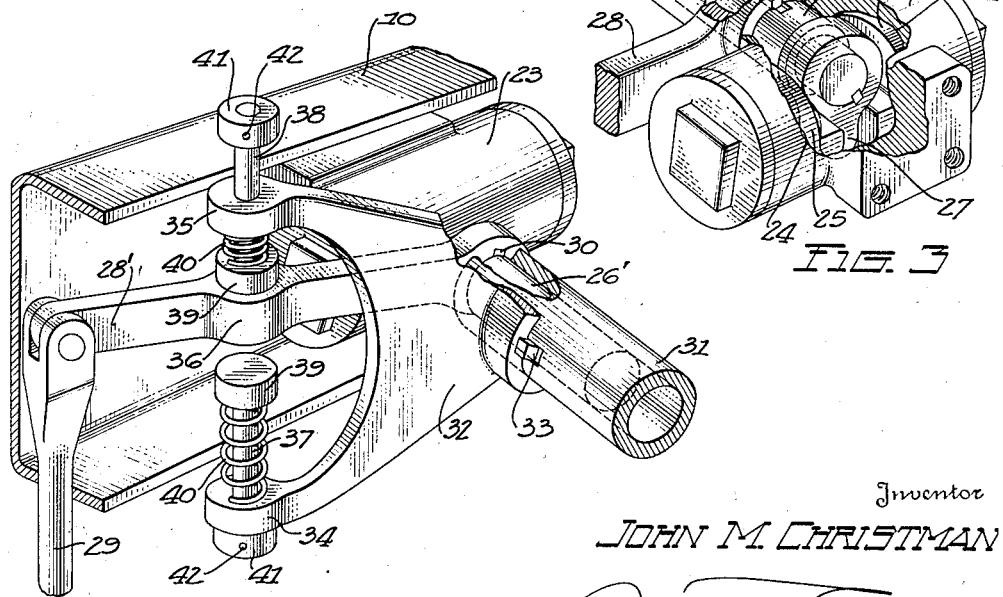
Fig. 2
Inventor
JOHN M. CHRISTMAN
By Milton Sittles
Attorney Patented May 11, 1937

2,079,899

UNITED STATES PATENT OFFICE 2,079,899

MOTOR VEHICLE

John M. Christman, Detroit, Mich., assignor to Packard Motor Car Company, Detroit, Mich., a corporation of Michigan Application November 26, 1934, Serial No. 754,728

8 Claims. (Cl. 267—11)

This invention relates to motor vehicles and more particularly to stabilizing and spring controlled means.

Motor vehicle wheels are generally connected and sprung in a manner such that the load supporting means and the wheels can move relatively in a vertical direction. With this form of mounting, the load supporting means will list or tilt sidewise when the course of vehicle travel is in other than a straight direction. It is well known that such tilting results from the effects of centrifugal force tending to continue the movement of the load supporting means in the same direction as that taken by the vehicle prior to a change in direction of travel.

Considerable effort has been made recently to reduce the degree of body tilting through the provision of stabilizing mechanism, generally, in the form of torque means applied to the frame or the body and engaging with either the rear wheel housing or the rear shock absorbers. Obviously when a torque bar or rod is employed as the stabilizing means, side tilting of the body is resisted by a force of increasing magnitude in a direction away from neutral position. While such torque stabilizer means decreases tilting of the vehicle body as compared with a vehicle having no stabilizer, the tilting is still noticeable to the occupants whenever there is a change in direction of travel and causes an uncomfortable ride.

An object of the invention is to provide a stabilizing connection between sprung and unsprung masses of a vehicle which presents different ranges of force resisting the action of centrifugal force tending to vary the relation of said masses when the vehicle is changing its course of travel.

Another object of the invention is to improve the riding qualities of a motor vehicle through the provision of stabilizing means which substantially prevents body tilting until centrifugal force of a predetermined magnitude is developed, and which restricts body tilting when such force is beyond said predetermined magnitude.

A further object of the invention is to improve the riding qualities of motor vehicles by interconnecting oppositely disposed shock absorbers in a relation substantially preventing their relative movement when centrifugal force below a predetermined magnitude, tends to tilt the load supporting means, and allowing a restricted movement of the shock absorbers relatively but in the same direction when such force is above said predetermined magnitude.

Other objects of the invention will appear from the following description taken in connection with the drawing, which forms a part of this specification, and in which:

Fig. 1 is a perspective view of the rear end of a portion of a vehicle having my invention associated therewith;

Fig. 2 is an enlarged perspective view, partly broken away, showing one end portion of the stabilizing mechanism;

Fig. 3 is an enlarged perspective view, partly broken away, of the other end portion of the stabilizing mechanism.

Referring now to the drawing by characters of reference, 10 indicates the side sills, and 11 is the rear cross member of a motor vehicle main frame. Carried at the rear end of such frame is a transversely extending axle housing 12 within which is mounted conventional power transmission mechanism for driving the rear wheels 13 of the motor vehicle. It will be understood a body (not shown) is carried on the frame in the conventional manner.

The axle, connected with the rear wheels, is sprung from the main frame or load carrying portion of the vehicle by a pair of longitudinally extending leaf spring structures 14. Links 15 are connected to the rear ends of the springs and are pivotally mounted on pins 16 carried by brackets 17 which are suitably secured to the side sills of the main frame. The forward ends of these springs are pivotally carried by pins 18 supported by brackets 19 which are suitably fixed to the side sills of the main frame. Bolts 20 extend over the axle housing adjacent the spring sides and are fastened to spring plates 21, thus securing the spring structures to the axle housing.

The vehicle so far described is conventional and the main frame is referred to as the load carrying means or the sprung mass while the wheels and axle structure are referred to as the unsprung mass, the springs 14 serving to connect the sprung and the unsprung masses.

Shock absorber means is connected between the sprung and the unsprung masses to dampen the action of the spring structures. Oppositely disposed hydraulic shock absorber casings 23 are fixed to the side sills by means of bolts 22. Each casing is formed to provide a pair of oppositely disposed chambers 24 in which pistons 25 are arranged to reciprocate. There is a fluid connection between the chambers of each shock absorber suitably controlled by valve mechanism as shown in my Patent No. 1,953,214 of April 3, 1934.

Extending into the shock absorber casings are rotatably mounted stub shafts 26 and 26' carrying piston actuators 27 on their ends extending into the casings. Rotation of the stub shafts will rock the actuators and thereby reciprocate the associated pistons 25. Horizontally disposed arms 28 and 28' are secured to the stub shafts 26 and 26' respectively, and such arms are connected to the spring plates therebelow by links 29. Suitable key members 30 are employed to fix the arms to the stub shafts.

This shock absorber means and the connection with the sprung and unsprung masses allows considerable body side sway or listing when the direction of the vehicle travel is being changed, and as hereinbefore related, stabilizing mechanism has been employed to reduce the degree of such body tilting. When such stabilizing means takes the form of a torque bar or similar member which is carried by the sprung mass and fixed to the unsprung mass, the body tilting resulting from centrifugal force, developed when the course of vehicle travel is changed, is resisted and thus the degree of body tilting is reduced. With such mechanism this torque resistance increases with the magnitude of developed centrifugal force so that there is less restraint to tilting in the lower range of applied centrifugal force. Because of this condition, the occupants of the vehicle are tilted sidewise to a greater extent than is desired whenever the course of vehicle travel is first changed.

It is proposed to connect the sprung and unsprung masses in a manner such that below a predetermined developed centrifugal force, caused by changing the course of vehicle travel, there will be substantially no relative movement of the shock absorbers but thereafter there can be a limited relative movement between the shock absorbers. With such a stabilizing arrangement, the occupants of the vehicle will not be tilted sideways until the predetermined centrifugal force is developed and when such force is beyond the predetermined magnitude then side tilting of the passengers will be restricted as compared with a vehicle in which there is no stabilizing mechanism.

Extending transversely of the vehicle frame, between the rear shock absorbers, is a tube 31 which at its ends telescopes the inner end portions of stub shafts 26 and 26'. The end of such tube associated with the stub shaft 26 is fixed thereto by the same key 30 which fixes the arm 28. The other end of the tube is freely mounted on the stub shaft 26', that is, it is not fixed thereon. Between this freely mounted end of the tube and the arm 28' is arranged connecting means which with the tube forms motion transmitting or stabilizing means between the two rear shock absorber mechanisms. This connecting means between the tube and the arm 28' consists of a member 32 having a hub portion fixed to the tube by a key 33 and control abutment means carried by arms 34 and 35 of the member 32. The arms 34 and 35 extend in a direction so that a bearing portion 36 of the arm 28' lies therebetween and is in vertical alignment with the ends thereof. Stems 37 and 38 extend through aligned openings in the end portions of the arms 34 and 35 respectively, and carry on their ends adjacent the bearing portion 36 of the shock absorber arm, abutment or bearing heads 39. Coil springs 40 surround the stems and are arranged between the abutment heads 39 and the arms of the member 32. Retainer means 41 are secured to the ends of the stems by means of pins 42 and prevent displacement of the abutment means relative to the arms 34 and 35.

The springs 40 cause the abutment members 39 to exert a similar pressure against the bearing portion 36 of the shock absorber arm 28' and the pressure of one of these springs, depending upon the direction in which the tube 31 is rotated, must be overcome before the arms 28 and 28' can move relatively. This pressure can be arranged as may be desired so that the sprung mass will be maintained parallel with the unsprung mass in a direction transversely of the vehicle while centrifugal force, created when the vehicle is changing its path of travel, is below a predetermined magnitude. It will be understood that the tube 31 is of a character such that torque deformation thereof will be negligible and hence there will be substantially no relative movement of the shock absorber arms prior to overcoming of the force exerted by the springs. When centrifugal force becomes great enough to overcome the pressure of either spring 40, then the arm 28' can rock in a vertical direction moving one of the abutment means 39 therewith, depending upon its direction of movement, and thus transmitting a similar but restricted motion between the stub shafts 26 and 26'. The arms 28 and 28' can thus move relatively when centrifugal force is of sufficient magnitude to overcome the force exerted by either spring 40.

Under some circumstances a relative movement between the arms 28 and 28', to allow some listing of the sprung mass, may be desired in the range of developed centrifugal force above the predetermined magnitude. This can be arranged by forming the springs 40 of a character such that they will not be entirely collapsed by the maximum action of developed centrifugal force.

Under other circumstances it may be desirable that the shock absorber arms 28 and 28' be relatively movable in only a central portion of the range of developed centrifugal force. The springs 40, in such case, must be of such a character that the abutment members 37 will collapse them against the arms of member 32 prior to the extreme centrifugal force development. The arms 28 and 28' will thus remain substantially fixed relatively, except for the negligible amount of torque that may be developed in the tube 31, upon the application of centrifugal force in the low and high portion of its range of development. In the intermediate range of centrifugal force development the springs 40 will be collapsing so that the arms 28 and 28' can move relatively a limited extent. Under such circumstances there will be substantially no tilting of the body due to the action of centrifugal force in the low and high portions of the range of force development, but some tilting of the body will take place in the portion of the range of developed centrifugal force between the high and low portions.

With the stabilizer construction herein described, the body will not tilt upon slight changes in the course of the vehicle travel and thus the occupants will not tilt sideways upon every change in the direction of vehicle travel. Of course, the occupants will be tilted some if the centrifugal force becomes sufficient to overcome the pressure of the springs 40, but under such circumstance it is necessary that a certain amount of body tilting be allowed to prevent the vehicle from skidding and developing other undesirable features when the course of travel is being materially changed. Furthermore, with the present construction it is possible to limit the body tilting within desired high and low limits of the centrifugal force-development which under some circumstances is desired.

Although the invention has been described in connection with a specific embodiment, the principles involved are susceptible of numerous ohter applications which will readily occur to persons skilled in the art. The invention is therefore to be limited only as indicated by the scope of the appended claims.

What I claim is:

1. In a vehicle, the combination with load supporting means and two opposite road wheels suspended from the load supporting means, of stabilizer mechanism comprising a shock absorber means between each wheel and the frame, and connecting means between the shock absorber means and the frame, said connecting means maintaining said shock absorber means in a substantially similar relation during the application of force below a predetermined magnitude tending to change the vertical relation of the wheels and the load supporting means and restricting the relative movement of said shock absorber means while the application of such force is above said predetermined magnitude.

2. In a vehicle, the combination with load supporting means, and two opposite road wheels suspended from the load supporting means, of stabilizer means comprising shock absorbers having portions fixed to said load supporting means and movable portions connected one with each wheel, and mechanism mounted on said load supporting means and connected to the movable portions of said shock absorbers, said last mentioned mechanism substantially locking the movable portions of the shock absorber means together when forces below a predetermined magnitude are applied tending to move the movable portions of the shock absorbers relatively and allowing a limited relative movement of the movable portions of the shock absorbers when such forces are greater than such predetermined magnitude.

3. In a vehicle, the combination of sprung and unsprung masses and shock absorber means between said masses, of stabilizer mechanism comprising a substantially rigid section and a resilient section, said sections cooperating and being associated to prevent relative movement of said masses transversely when forces tending to change such relation are below a predetermined magnitude.

4. In a vehicle, a load supporting means, a pair of oppositely disposed road wheels sprung from said load supporting means, a shock absorber connected between each wheel and said load supporting means and stabilizing mechanism connecting movable portions of said shock absorbers comprising a tube rotatably mounted on said load supporting means and fixed to one of said shock absorber means, a member fixed to the tube, and preloaded resilient means connecting said member with the other of said shock absorber means.

5. In a vehicle, a load supporting means, oppositely disposed road wheels sprung from said load supporting means, shock absorbers connected with said wheels and said load supporting means and stabilizing means comprising a transversely extending member mounted on said load supporting means having one end fixed to one of said shock absorber means, a member fixed to the other end of said tube, and spring abutment means carried by said member and engaging the other shock absorber means, said stabilizing means locking said shock absorber means together while centrifugal force tending to move the shock absorber means relatively is below a predetermined magnitude.

6. In a vehicle, the combination with a load supporting means and oppositely disposed road wheels sprung from said load supporting means, of stabilizing mechanism connecting said road wheels and associated with said supporting means comprising a plurality of relatively movable members and connecting means between said members, said connecting means substantially fixing the members together in a relation causing the wheels to move similarly in a vertical direction when a force below a predetermined magnitude is applied to either of the wheels and restricting relative movement of the members in a relation allowing the wheels to move dissimilarly a limited extent in a vertical direction when a force above the predetermined magnitude is applied to either of the wheels.

7. In a vehicle, the combination with a load supporting means and oppositely disposed road wheels sprung from said load supporting means, of stabilizing mechanism comprising shock absorbers each having a stationary part fixed to the load supporting means and a movable part fixed to a wheel, relatively movable members connecting the movable parts of the shock absorbers, and a connection between said movable members said connection fixing the parts to move together until forces above a predetermined magnitude are applied to the wheels tending to cause their independent vertical movement and restricting the relative movement of the members thereafter.

8. In a vehicle, the combination with a load supporting means and oppositely disposed road wheels sprung from said load supporting means, of stabilizing mechanism connecting said road wheels and associated with said supporting means comprising a plurality of relatively movable members and connecting means between said members, said connecting means fixing the members together in a relation causing the wheels to move similarly in a vertical direction when vertical forces are applied to either wheel below and above predetermined magnitudes and causing a relative movement of the members to allow a limited differential in vertical movement of the wheels when vertical forces intermediate said predetermined forces are applied to the wheels.

JOHN M. CHRISTMAN.